(12) United States Patent
Ciaramitaro et al.

(10) Patent No.: US 8,597,759 B2
(45) Date of Patent: Dec. 3, 2013

(54) GRAPHIC HAVING SIMULATED STITCHING

(75) Inventors: Fred Ciaramitaro, Eastpointe, MI (US); James R. Johnson, Jr., Columbiaville, MI (US)

(73) Assignee: Stahl's Inc., St. Clair Shores, MI (US)

( * ) Notice: Subject to any disclaimer, the term of this patent is extended or adjusted under 35 U.S.C. 154(b) by 1629 days.

(21) Appl. No.: 11/529,843

(22) Filed: Sep. 29, 2006

(65) Prior Publication Data
US 2008/0078315 A1    Apr. 3, 2008

(51) Int. Cl.
*B32B 3/06*    (2006.01)
(52) U.S. Cl.
USPC ............... 428/102; 428/88; 428/99; 216/11
(58) Field of Classification Search
USPC .......... 216/2, 28, 11, 12, 7; 428/192, 193, 88, 428/90, 101, 102, 190, 200; 101/33, 34
See application file for complete search history.

(56) References Cited

U.S. PATENT DOCUMENTS

| | | | |
|---|---|---|---|
| 5,438,520 A * | 8/1995 | Satoh et al. | 700/132 |
| 2003/0054137 A1* | 3/2003 | Kisha et al. | 428/193 |
| 2003/0150341 A1 | 8/2003 | Ciaramitaro et al. | |
| 2004/0154480 A1* | 8/2004 | Ciaramitaro et al. | 101/33 |

FOREIGN PATENT DOCUMENTS

| | | |
|---|---|---|
| GB | 598439 A | 2/1948 |
| GB | 0506601 A | 9/1992 |
| JP | 07166455 A | 6/1995 |
| WO | WO-2007103168 A | 9/2007 |

OTHER PUBLICATIONS

PCT International Search Report for PCT/US2007/080088 dated Mar. 17, 2008.

* cited by examiner

*Primary Examiner* — Lan Vinh
(74) *Attorney, Agent, or Firm* — Rader, Fishman & Grauer PLLC

(57) ABSTRACT

A graphic for application to a textile is disclosed. The graphic includes a front surface configured to be viewable when the graphic is applied to the textile. The graphic further includes a back surface opposite the front surface and configured to contact the textile. The graphic further includes an attachment mechanism, other than stitching, that attaches the graphic to the textile. The graphic also includes a simulated stitching pattern "etched" onto the front surface of the graphic extending around a perimeter of the graphic and includes projections simulating stitch ends.

12 Claims, 3 Drawing Sheets

GRAPHIC HAVING SIMULATED STITCHING

TECHNICAL FIELD

The embodiments described herein are generally directed to graphics, such as numbers, letters, licensed characters, figures, and other images, that are applied to garments and other textiles.

BACKGROUND

Graphics, such as letters, numbers, licensed characters, figures, and other images are commonly applied to garments and other textiles. Many different techniques exist for applying such graphics, including screen printing, heat transfer, stitching, etc. Each available technique gives the graphic a somewhat different appearance. For example, when a graphic is stitched onto a garment or textile, the stitch marks are visible to an observer. For various applications, this "stitched" appearance is desirable. However, stitching graphics onto a textile is more costly and time consuming than other methods of applying graphics, such as adhering the graphic to the textile using a heat-activated adhesive, for example.

The inventors hereof have recognized a need to provide a graphic that has a "stitched" appearance, but is faster and more cost-effective to apply to a textile than actually stitching the graphic to the textile.

DETAILED DESCRIPTION

The embodiments described herein relate to a graphic and related methods for generating and applying such graphic to a textile having a "stitched" appearance, but which does not involve actually stitching the graphic to the textile. A cutting device, such as but not limited to a laser, is used to cut the graphic from a material. The cutting device is further used to create "scallops" around the perimeter of the graphic such that a series of small projections of material extends outward from the perimeter of the graphic to emulate the appearance of the stitching thread that would normally be present outside the perimeter of the graphic if the graphic were actually stitched to the textile. The cutting device is further used to "etch" a pattern into the graphic itself, near the graphic's perimeter, to emulate the stitching thread that would normally be present on the interior of the graphic if the graphic were actually stitched to the textile. The graphic is then applied to the textile using a method other than stitching, such as adhesion using a heat-activated adhesive on the backing of the graphic. In this way, the desired "stitched" appearance is achieved at a lower cost.

Figure 1:
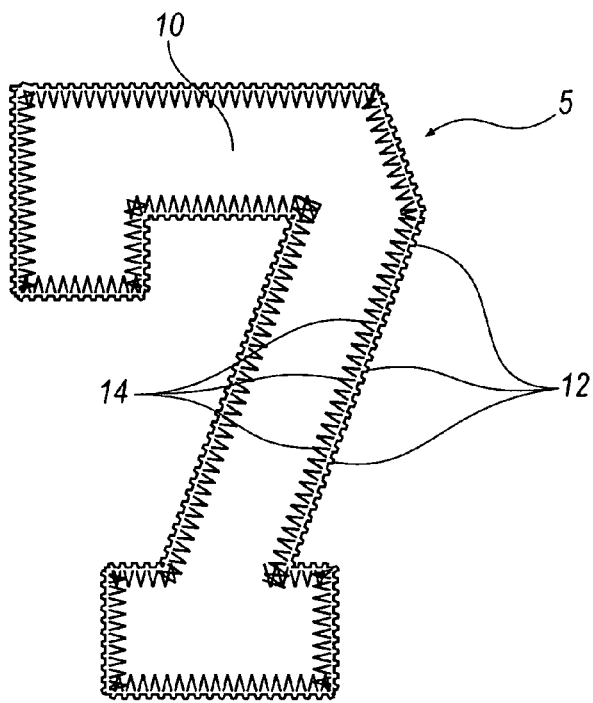
FIG. 1 illustrates an exemplary graphic having a simulated stitching pattern extending around the perimeter of the graphic.
Figure 2:
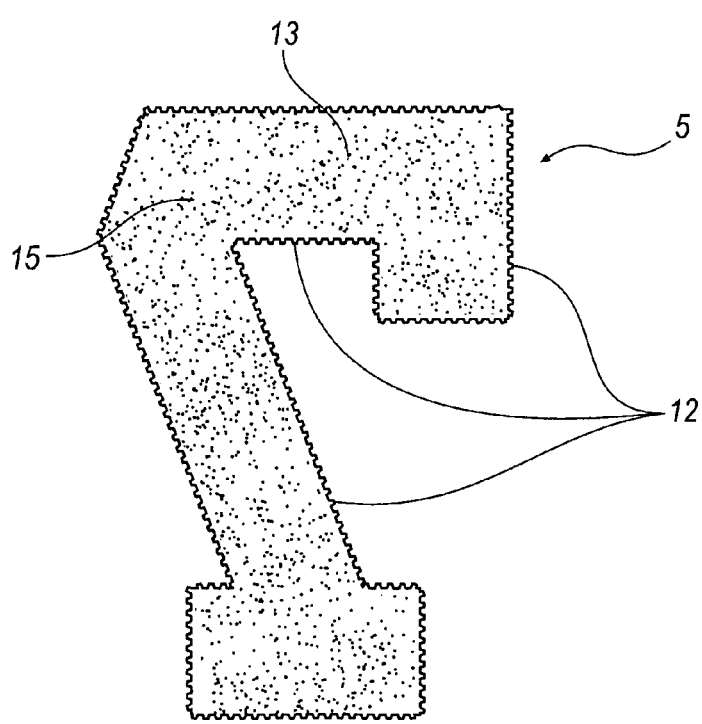
FIG. 2 illustrates the back side of the graphic shown in FIG. 1.
Figure 3:
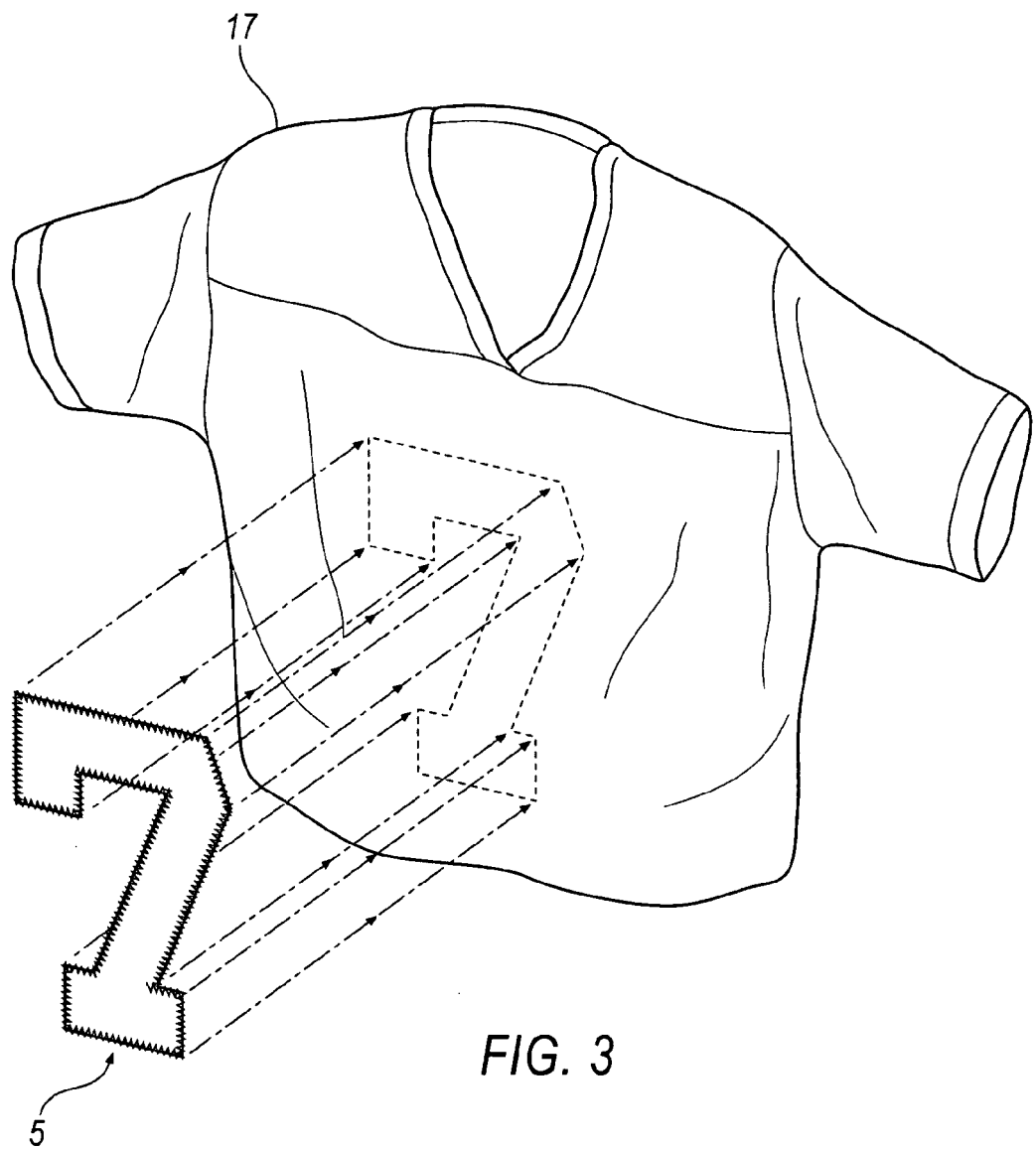
FIG. 3 is a perspective view of the graphic shown in FIGS. 1 and 2 relative to a textile to which the graphic is applied.

FIG. 1 illustrates an exemplary graphic having a stitched appearance, but which is not actually stitched to a textile. Graphic 5 is shown in FIG. 1 as a numeric "7." Clearly, graphic 5 can be any type of letter, number, figure, character, or other image that is to be applied to a garment or other textile. Graphic 5 includes a front surface 10 and a back surface 13 (shown in FIG. 2) on the opposite side of the front surface 10. The front surface 10 of the graphic 5 is intended to face outward from the textile when the graphic 5 is applied to the textile. The back surface 13 is intended to be in contact with the textile to which the graphic 5 is applied, as shown in FIG. 3. The back surface of the graphic 5 includes a mechanism, other than stitching thread, for attaching the graphic to a garment or other textile. Various attachment mechanisms can be used, including various adhesives, including heat-activated adhesives. The back side 13 of the graphic is shown in FIG. 2 having adhesive 15 thereon to act as the attachment mechanism.

As best shown in FIG. 1, the graphic 5 has a simulated stitching appearance around the perimeter of the graphic 5. The simulated stitching appearance includes a series of projections 12 that extend outward from the perimeter of the graphic 5 to create a "scalloped" appearance on the perimeter of the graphic, effectively emulating the appearance of stitching thread attaching the graphic 5 to the textile outside of the graphic 5. The projections 12 are created while cutting the perimeter of the graphic 5 using a "scalloped" contour as the perimeter of the graphic 5 and are integral with the graphic 5. The graphic 5, including the projections 12, may be cut from a roll or piece of material using a laser cutting system. The simulated stitching appearance also includes an etched pattern 14 on the interior portion of the graphic 5. The etched pattern 14 may be created by using a laser or other device to create "lines" on the material of the graphic 5. Together, the projections 12 and etched pattern 14 create the appearance of stitching thread applied around the perimeter of the graphic 5 to couple the graphic 5 to a textile. However, it is the attachment mechanism on the back side of the graphic 5, such as an adhesive, that actually attaches the graphic 5 to a textile.

Figure 4:
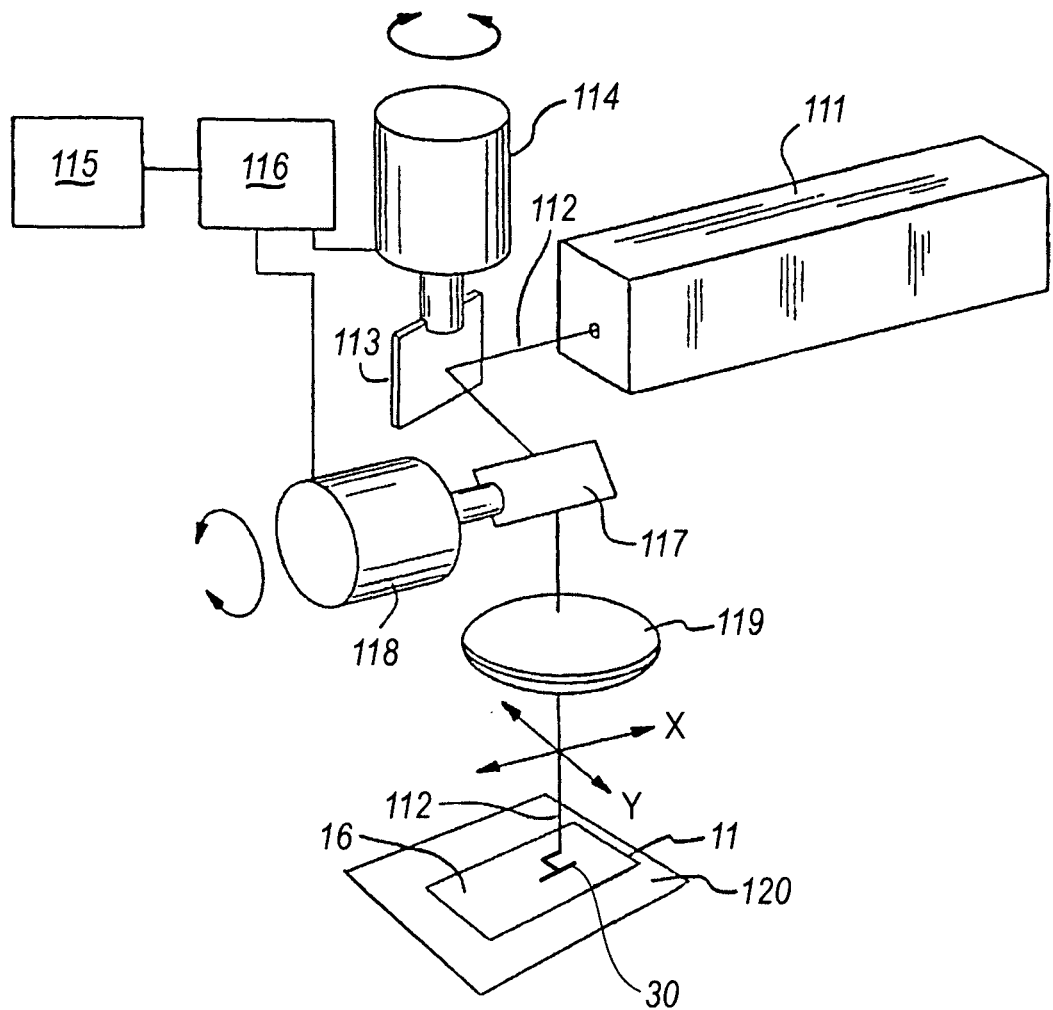
FIG. 4 illustrates an exemplary laser device that can be used create the graphic illustrated in FIG. 1.

One possible laser system that can be used to cut the graphic 5 (including the projections 12) and to create the etched pattern 14 in the material of the graphic 5 to simulate a stitched appearance is described below, with reference to FIG. 4. The laser 111 of FIG. 4 generates a laser beam 112 in the direction of a computer numerically controlled mirror system. The mirror system includes an x-axis mirror 113. The x-axis mirror 113 is mounted on an x-axis galvanometer 114. The x-axis galvanometer 114 is adapted to rotate to cause rotation of the x-axis mirror 113. Rotation of the x-axis mirror 113 causes movement of the laser beam 112 along the x-axis. A numerical control computer 115 controls the output of a power source 116 to control rotation of the x-axis galvanometer. The laser beam 112 is deflected by the x-axis mirror 113 and directed toward a y-axis mirror 117. The y-axis mirror 117 is mounted on an y-axis galvanometer 118. The y-axis galvanometer 118 is adapted to rotate to cause rotation of the y-axis mirror 117. Rotation of the y-axis mirror 117 causes movement of the laser beam 112 along the y-axis. The numerical control computer 115 controls the output of the power source 116 to control rotation of the y-axis galvanometer 118.

The laser beam 112 is deflected by the y-axis mirror 117 and directed through a focusing lens 119. The lens 119 is adapted to focus the laser beam 112. The lens 119 is a multi-element flat-field focusing lens assembly, which optically maintains the focused spot on a flat plane as the laser beam moves across the material 11 to generate the graphic 30. The apparatus 110 further includes a working surface 120 which can be almost any solid substrate such as a table, or even a gaseous fluidized bed. The material 11 is placed on the working surface 120. The working surface 120 can be adjusted vertically to adjust the distance from the lens 119 to the grain 16 of the material 11.

The preceding description has been presented only to illustrate and describe exemplary embodiments of the methods and systems. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A graphic for application to a textile, comprising:
    a single layer graphic having a front surface configured to be viewable when the graphic is applied to the textile;
    a back surface opposite said front surface, said back surface configured to contact the textile; and
    an attachment mechanism, other than stitching, configured to attach the graphic to the textile; and
    a simulated stitching pattern extending around a perimeter of the graphic, wherein said simulated stitching pattern includes a series of projections extending outward from said perimeter of the graphic, wherein said series of projections are formed integrally with the single layer graphic.

2. The graphic of claim 1, wherein said attachment mechanism is adhesive disposed on said back side of the graphic.

3. The graphic of claim 1, wherein said simulated stitching pattern comprises:
    a pattern applied to an interior portion of said front surface of the graphic;
    wherein the combination of said pattern and said series of projections together create an appearance of the graphic being stitched to the textile.

4. The graphic of claim 1, wherein said series of projections are cut from the same material as the graphic.

5. The graphic of claim 2, wherein said adhesive is heat-activated.

6. The graphic of claim 1, wherein said simulated stitching pattern includes a pattern applied to an interior portion of the front surface of the graphic.

7. The graphic of claim 6, wherein said pattern is etched into said front surface of the graphic.

8. The graphic of claim 7, wherein said etching comprises lines cut into the front surface of the graphic.

9. A single layer graphic, comprising:
    a top surface configured to be viewable when the graphic is applied to a textile;
    a bottom surface opposite said top surface, said bottom surface configured to directly contact said textile through an adhesive attachment mechanism, wherein said adhesive attachment mechanism is disposed on said bottom surface and configured to attach the bottom surface directly to said textile; and
    a simulated cross stitching pattern cut and etched into said graphic and extending around a perimeter of the graphic, wherein said simulated stitching pattern includes a series of projections extending outward from said perimeter of the graphic, wherein said series of projections are formed integrally with the single layer graphic.

10. The graphic of claim 9, wherein said simulated stitching pattern includes a pattern applied to an interior portion of the top surface of the graphic.

11. The graphic of claim 9, wherein said simulated stitching pattern comprises:
    a pattern applied to an interior portion of said top surface of the graphic;
    wherein the combination of said pattern and said series of projections together create an appearance of the graphic being stitched to the textile.

12. The graphic of claim 9, wherein said adhesive attachment mechanism includes a heat-activated adhesive.

* * * * *